(12) United States Patent
Vander Lind et al.

(10) Patent No.: US 9,611,835 B1
(45) Date of Patent: Apr. 4, 2017

(54) MOTOR CONTROL TOPOLOGY FOR AIRBORNE POWER GENERATION AND SYSTEMS USING SAME

(71) Applicant: Google Inc., Mountain View, CA (US)

(72) Inventors: Damon Vander Lind, Alameda, CA (US); Geoff Dolan, San Francisco, CA (US); Corwin Hardham, Mountain View, CA (US)

( * ) Notice: Subject to any disclaimer, the term of this patent is extended or adjusted under 35 U.S.C. 154(b) by 447 days.

(21) Appl. No.: 14/154,004

(22) Filed: Jan. 13, 2014

Related U.S. Application Data (60) Provisional application No. 61/751,817, filed on Jan. 11, 2013.

(51) Int. Cl.
F03D 7/02 (2006.01)

(52) U.S. Cl.
CPC .................... *F03D 7/028* (2013.01)

(58) Field of Classification Search
CPC ........................................ F03D 7/028
USPC .................................... 290/44, 55
See application file for complete search history.

(56) References Cited

U.S. PATENT DOCUMENTS

| | | | |
|---|---|---|---|
| 4,288,727 A | 9/1981 | Whitford | |
| 4,718,833 A | 1/1988 | Berger | |
| 6,479,957 B1 | 11/2002 | Erdman et al. | |
| 8,081,019 B2 | 12/2011 | Jungreis | |
| 2002/0084757 A1 | 7/2002 | Ewbank et al. | |
| 2002/0113167 A1 | 8/2002 | Albero et al. | |
| 2004/0027105 A1 | 2/2004 | Nakamura et al. | |
| 2009/0167231 A1 | 7/2009 | Sussmeier et al. | |
| 2010/0283253 A1 | 11/2010 | Bevirt | |
| 2010/0295303 A1* | 11/2010 | Lind | B64C 39/022 290/44 |
| 2010/0295320 A1* | 11/2010 | Bevirt | B64C 39/022 290/55 |
| 2011/0031344 A1* | 2/2011 | Grenier | F03D 11/02 244/17.11 |
| 2011/0260462 A1* | 10/2011 | Vander Lind | A63H 27/002 290/55 |

(Continued)

FOREIGN PATENT DOCUMENTS

| | | |
|---|---|---|
| JP | 5299519 | 9/2013 |
| WO | 2012118797 | 9/2012 |

OTHER PUBLICATIONS

International Searching Authority, International Search Report and Written Opinion for PCT/US2014/070542 mailed Mar. 31, 2015, 9 pages.

*Primary Examiner* — Viet Nguyen
(74) *Attorney, Agent, or Firm* — McDonnell Boehnen Hulbert & Berghoff, LLP (57) ABSTRACT

A motor control topology relevant to airborne wind turbines and a control process for such a motor control topology is disclosed herein. A system may include an aerial vehicle that may include a plurality of propellers, a plurality of drive units coupled to the plurality of propellers, and a tether. Each drive unit may include a motor/generator and a motor controller. The plurality of drive units may include at least two pairs of drive units that include a first drive-unit pair and a second drive-unit pair. The drive units in each drive pair may be connected in parallel, and the at least two pairs of drive units may be connected in series. The drive units may be configured to operate in a first mode and operate in a second mode.

16 Claims, 7 Drawing Sheets

(56) References Cited

U.S. PATENT DOCUMENTS

2013/0155735 A1 6/2013 Ilic et al.
2013/0233964 A1 9/2013 Woodworth et al.

\* cited by examiner

Legend

---------- Thrust Coefficient

__________ Drag Coefficient

MOTOR CONTROL TOPOLOGY FOR AIRBORNE POWER GENERATION AND SYSTEMS USING SAME

CROSS REFERENCE TO RELATED APPLICATION

This patent application claims priority to U.S. Provisional Patent Application No. 61/751,817, filed Jan. 11, 2013, the contents of which are entirely incorporated herein by reference, as if fully set forth in this application.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

A wind energy system may take the form of an airborne wind turbine (AWT) system. AWT systems may extract useful power from the wind for various purposes such as, for example, generating electricity, lifting or towing objects or vehicles, etc.

In an AWT system, it may be desirable to achieve a high operating voltage so as to, for example, reduce ohmic losses in the AWT system. While the operating voltage of a single motor in an AWT may be limited by practical electronics, a higher operating voltage may be achieved by stacking motor/generator in series. (Herein, a "motor/generator" may be a component that can switch between functioning as a motor for a propeller, and a generator that converts kinetic energy of the rotating propeller to electrical energy.)

However, motors that are stacked in series may exhibit instability. More specifically, if motor/generators that are stacked in series are controlled to have approximately equal power, and the respective currents running through each motor/generators are not approximately equal, the voltages of the motor/generators may diverge, such that the motor/generators exhibit voltage instability. Disclosed herein are configurations for motor/generators that are stacked in series in an AWT, and controls systems therefore. In particular, an example aerial vehicle in an AWT may include pairs of drive units may be stacked in series, with each drive unit in a drive-unit pair including a motor/generator and a motor controller. Beneficially, some examples described herein may allow for high operating voltages on the tether to be connected to a number of lower voltage drive units, while reducing or eliminating the risk of voltage instability.

In one aspect, a system includes: (a) an aerial vehicle comprising a plurality of propellers; (b) a plurality of drive units coupled to the plurality of propellers, wherein each drive unit comprises a motor/generator and a motor controller, wherein the plurality of drive units comprises at least two pairs of drive units comprising a first drive-unit pair and a second drive-unit pair, wherein the drive units in each pair of drive units are connected in parallel, and wherein the at least two pairs of drive units are connected in series; and (c) a tether, wherein the tether configured to transmit power down from the plurality of motor/generators when the drive units operate in a first mode, and to transmit power up to the plurality of motor/generators when the drive units operate in a second mode. Further, the motor controllers in the drive units are connected to the tether in parallel and in series.

In another aspect, a system includes: (a) a plurality of drive units that are couplable to a plurality of propellers, wherein each drive unit comprises a motor and a motor controller, wherein the plurality of drive units comprises at least two pairs of drive units comprising a first drive-unit pair and a second drive-unit pair, wherein the drive units in each pair of drive units are connected in parallel, and wherein the at least two pairs of drive units are connected in series; (b) a first bus that connects the motor controllers in at least the first drive-unit pair to a tether; (c) a second bus that connects the motor controllers in at least the second drive-unit pair to the tether; and (d) a third bus that connects the motor controllers in the first and second drive-unit pairs in series.

In a further aspect, a system includes: (a) an aerial vehicle comprising a plurality of propellers; (b) a plurality of drive units coupled to the plurality of propellers, wherein each drive unit comprises a plurality of motor/generators and a corresponding plurality of motor controllers wherein the plurality of drive units comprises at least two pairs of drive units comprising a first drive-unit pair and a second drive-unit pair, wherein the drive units in each pair of drive units are connected in parallel, and wherein the at least two pairs of drive units are connected in series; (c) a tether, wherein the tether configured to transmit power down from the plurality of motor/generators when the drive units operate in a first mode, and to transmit power up to the plurality of motor/generators when the drive units operate in a second mode. Further, the motor controllers in the drive units are connected to the tether in parallel and in series.

These as well as other aspects, advantages, and alternatives will become apparent to those of ordinary skill in the art by reading the following detailed description, with reference where appropriate to the accompanying drawings.

DETAILED DESCRIPTION

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Overview

Illustrative embodiments relate to aerial vehicles, which may be used in a wind energy system, such as an Airborne Wind Turbine (AWT). In particular, motor topologies relevant to aerial vehicles in AWTs and control processes for such motor control topologies are disclosed herein.

By way of background, an AWT may include an aerial vehicle that flies in a path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some embodiments, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, the ground station may deploy (or launch) the aerial vehicle. For example, in one embodiment, the aerial vehicle may be deployed when the wind speed is at or greater than 3.5 meters per second (m/s) at an altitude of 200 meters (m), In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers (or rotors) of the aerial vehicle may cause the aerial vehicle to hover over the ground. In some embodiments, the aerial vehicle may vertically ascend or descend in hover flight.

In crosswind flight, the aerial vehicle may be propelled by the wind substantially along a path, which as noted above, may convert kinetic wind energy to electrical energy. In some embodiments, the one or more propellers of the aerial vehicle may generate electrical energy by slowing down the incident wind.

The aerial vehicle may enter crosswind flight when (i) the aerial vehicle has attached wind-flow (e.g., steady flow and/or no stall condition (which may refer to no separation of airflow from an airfoil)) and (ii) the tether is under tension. Moreover, the aerial vehicle may enter crosswind flight at a location that is substantially downwind of the ground station.

In some embodiments, a tension of the tether during crosswind flight may be greater than a tension of the tether during hover flight. For instance, in one embodiment, the tension of the tether during crosswind flight may be 15 kilonewtons (KN), and the tension of the tether during hover flight may be 1 KN.

In line with the discussion above, an example aerial vehicle may generate electrical energy in crosswind flight and may thereby allow the AWT to extract useful power from the wind. The aerial vehicle may generate electrical energy in various wind conditions such as high wind speeds, large gusts, turbulent air, or variable wind conditions. Generally, the inertial speed of the aerial vehicle, the tension of the tether, and the power output of the AWT increase as the wind speed increases. Additionally, the power output typically has a maximum effective limit (rated power output). The wind speed at which the power output limit is reached is defined as the rated wind speed. Additionally, the power generation components of the AWT may produce heat, and as power output increases, the heat production may increase, potentially limiting the operational parameters of the AWT. Therefore, it may be desirable to enact control schemes that control the power generation components and therefore control their heat production.

Considering this, disclosed embodiments may allow for operating an aerial vehicle of an AWT in crosswind-flight in a manner that may efficiently generate power generation in variable wind conditions such as those noted above. Further, while there are other motor configurations capable of achieving a high voltage at the tether, such as a voltage converter converter or the use of another intermediate low to high voltage conversion device, the embodiments described herein may be advantageous over other solutions by using only a single stage to connect low-power motor controllers to a high-voltage tether, which in turn may lower cost and increase the efficiency with which the AWT converts wind energy to electrical energy.

Illustrative Airborne Wind Turbines

Figure 1:
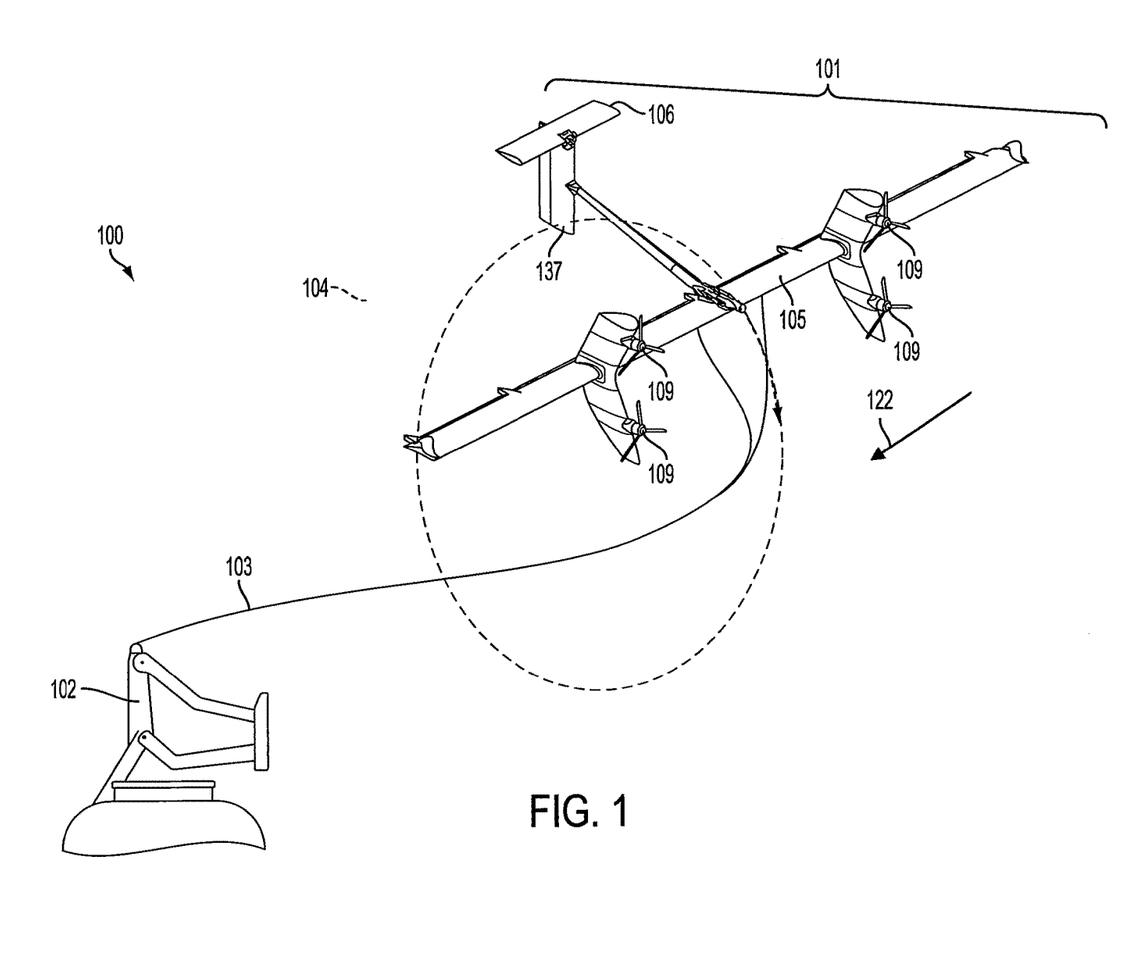
FIG. 1 is a diagram depicting a kite system according to some embodiments of the present invention.

FIG. 1 is a diagram depicting an embodiment of a AWT system 100 in accordance with example embodiments. Herein, an AWT system, such as AWT system 100, may also be referred to as a "kite system," and the aerial vehicle 101 in an AWT system 100 may also be referred to as a "kite."

The kite system 100 comprises a tether 103 that connects the kite 101 to the ground station 102. The kite 101 may fly along the flightpath 104 in order to generate power; e.g., by converting wind energy to electrical energy. In an example embodiment, kite 101 may fly along flightpath 104 at a high multiple of the speed of the wind 122.

The aerial vehicle 101 may also be referred to as "kite 101," and may include or take the form of various types of devices, such as a wing, and/or an airplane, among other possibilities. The aerial vehicle 101 may be formed of solid structures of metal, plastic and/or other polymers. The aerial vehicle 101 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The ground station 102 may be used to hold and/or support the kite 101 until it is in an operational mode. The ground station 102 may also be configured to allow for the repositioning of the aerial vehicle 101 such that deploying of the device is possible. Further, the ground station 102 may be configured to receive the aerial vehicle 101 during a landing. The ground station 102 may be formed of any material that can suitably keep the aerial vehicle 101 attached and/or anchored to the ground while in hover flight, forward flight, crosswind flight. In some implementations, a ground station 102 may be configured for use on land. However, a ground station 102 may also be implemented on a body of water, such as a lake, river, sea, or ocean. For example, a ground station could include or be arranged on a floating off-shore platform or a boat, among other possibilities. Further, a ground station 102 may be configured to remain stationary or to move relative to the ground or the surface of a body of water.

In some embodiments, to launch and land, the kite 101 hovers under thrust from the rotors 109, which are controlled by a control system. In example embodiments, the control system may be automated (e.g., operate without a human operator) or be partially automated. Further, the control system may implement control of the kite 101, at least in part, by controlling drive units for the rotors. Each drive unit may include a motor controller and one or more motors connected the propellers via a shaft. The motor controller may be operable to adjust the amount and/or direction of current between the motor a circuit to which the drive unit is connected (e.g., a circuit with the tether 103). Accordingly the control system may send control signals to the motor controllers in order to control the kite 101.

To provide pitch control authority for kite 101, the rotors 109 may be distributed both substantially above and below the center of gravity of the kite 101, as viewed in the typical aircraft build reference frame. In some embodiments, the tail 106 may include a horizontal element which is located substantially above the kite center of gravity, and which may be configured to rotate 90 degrees to pitch down during hover flight, which helps to both reduce the pitching moment on the kite 101 due to the wind 122 on the tail 106, and to stabilize the kite 101 in pitch.

The kite 101 further comprises a main wing 105. In embodiments in which kite system 100 is used to generate power, the main wing 105 is used to generate substantial lift, such that the kinetic energy available in the wind 122 is transferred into the kite 101 in the same manner as the tip of a wind turbine blade. However, a subset of the rotors 109 may be located substantially above the wing 105 to provide pitch stability during hover flight, and to reduce the interaction of the wake of the rotors 109 with the main wing 105.

Figure 2:
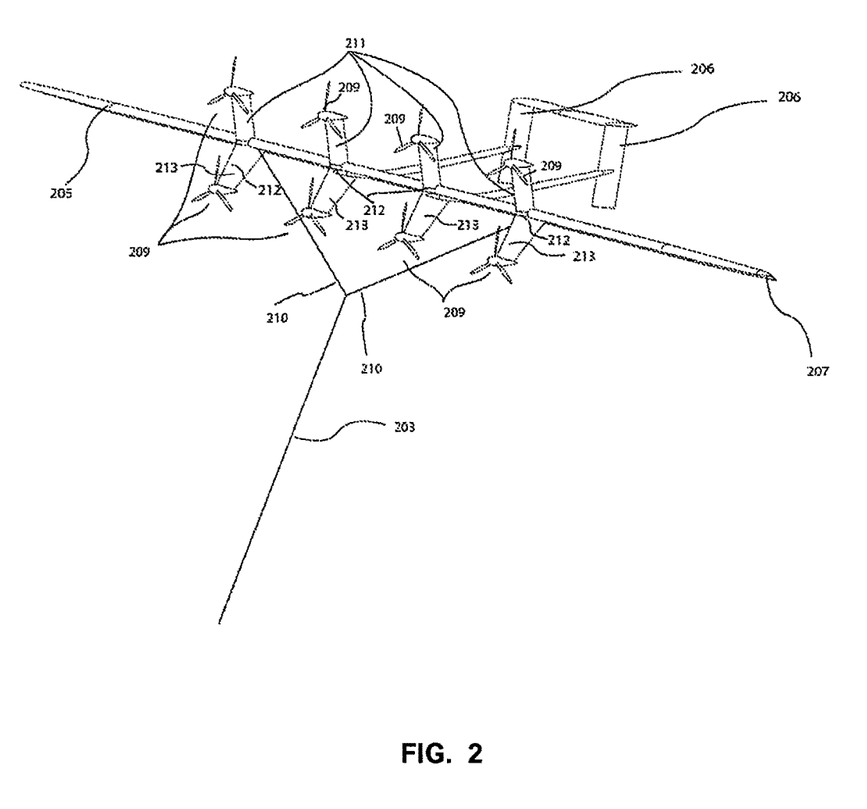
FIG. 2 is an illustration of a kite according to some embodiments of the present invention.

FIG. 2 is a diagram depicting an example aerial vehicle 201 in greater detail. As with aerial vehicle 101, aerial vehicle 201 may also be referred to as kite 201. Kite 201 may be implemented as the kite 101 in the kite system 100 depicted in FIG. 1, and/or may be implemented in other systems, such as other AWTs.

The kite 201 comprises a main wing 205, which generates substantial lift during operation of the kite 201 along a flightpath (e.g. flightpath 104). In some embodiments, the main wing 205 comprises a trailing element 207, which increases the maximum coefficient of lift which may be generated by the main wing 205.

The kite 201 further comprises a tail 206, which may serve both to counter the pitching moment generated by the main wing 205 and trailing element 207, and to increase the pitch, yaw, and coupled stability of the kite 201. However, the tail 206 adds mass to the kite 201. Therefore, in order to locate the kite's center of mass 223 at a target location near the quarter chord of the main wing 205, a countering mass may be located forward of the main wing 205. For example, rotors 209, along with the motor/generators (not shown) that drive rotors 209 may be located towards the front of the main wing 205 such that the mass of the rotors 209 and the motor/generators counters the mass of the tail 206, resulting in a center of mass 223 at the desired location.

The rotors 209 and the associated motor/generators are attached to the wing through the motor pylons 212. In the illustrated embodiment, the motor pylons 212 locate the rotors 209 in a pattern with rotors substantially above and/or below the main wing, such that the average rotor location has a substantial distance from any particular rotor location, as viewed on the plane perpendicular to kite direction of flight. In some embodiments, such as that shown in FIG. 2, the rotors are aligned in two horizontal rows of rotors. In other embodiments, the rotors may be arranged in an octagonal pattern, hexagonal pattern, or another pattern.

Figure 3:
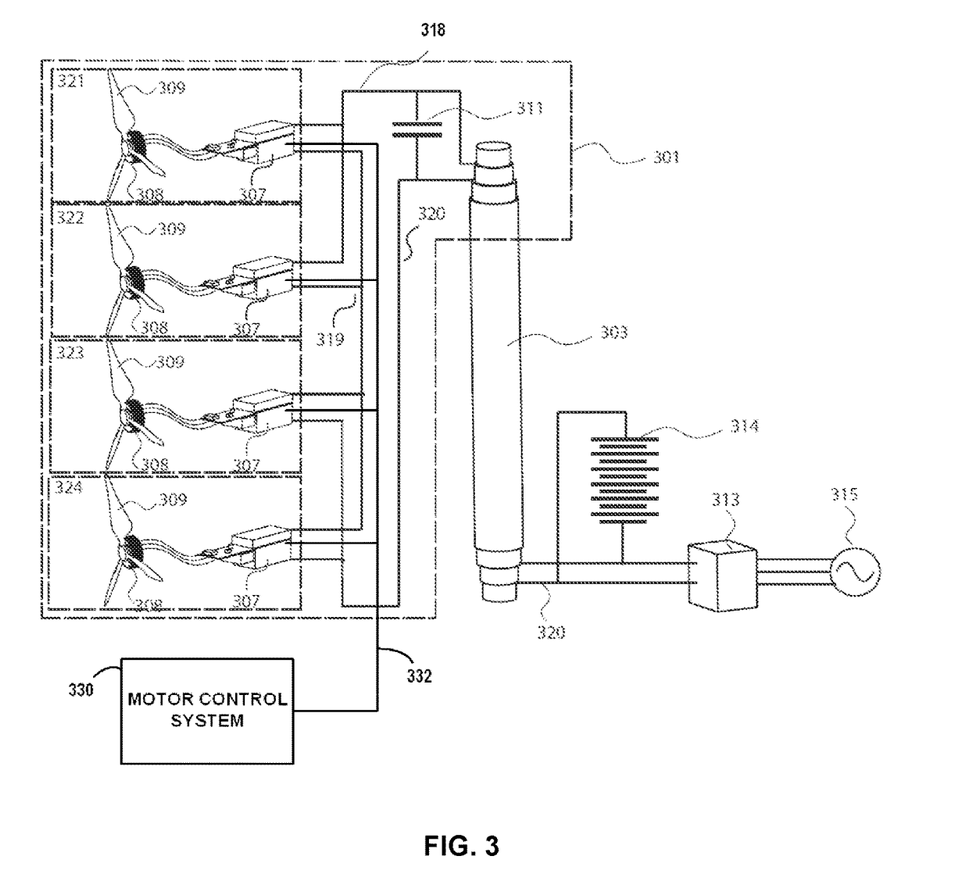
FIG. 3 is a diagram depicting an electrical system according to some embodiments of the present invention.

FIG. 3 is a diagram depicting the electrical system for an airborne wind turbine that, for the purposes of explanation, comprises four drive units, 321, 322, 323 and 324. Such an electrical system could comprise as few as two or as many as twelve, twenty, or possibly even more more drive units. In some applications, four drive units is the smallest number of drive units that will allow for different power levels to be sourced from or sunk to each motor/controller without unduly increasing the voltage across each drive unit. An example embodiment includes eight drive units. However, more or less drive units are possible, without departing from the scope of the invention.

In an example embodiment, each drive unit 321, 322, 323, and 324 may include a propeller 309, a motor/generator 308, and a motor controller 307. Alternatively, a "drive unit" may be considered to include a motor/generator 308 and a motor controller 307, and the propeller 309 may be considered separate a component from the drive unit, which is coupled to the motor/generator in the drive unit.

Note that the motor controllers 307 of drive units 321 and 322 are connected in parallel. As such, drive units 321 and 322 may be collectively referred to as "pair" of drive units (i.e., a "drive-unit pair"). Similarly, because the motor controllers 307 of drive units 323 and 324 are connected in parallel, drive units 323 and 324 may also be collectively referred to as a drive-unit pair. In a further aspect, according to an example motor topology, the drive-unit pairs are connected in series. For example, in the illustrated embodiment, a first drive-unit pair (drive units 321 and 322) is connected in series with a second drive-unit pair (drive units 323 and 324).

The motor controllers 307 may take the form of or include switching hardware that is operable to control the current and/or phase of current through the windings of motor/generators 308. In some embodiments, the motor controllers 307 may utilize power switching devices such as insulated-gate bipolar transistor (IGBT) switches or metal-oxide-semiconductor field-effect transistor (MOSFET) switches that are etched into silicon or other semiconductor dies. The maximum attainable voltage between any two leads of a power switching device is typically limited, which in turn limits the maximum attainable voltage within a circuit utilizing the power switching device. Furthermore, the delay time when switching a power switching device from an "on" state to an "off" state typically increases significantly as the maximum voltage of the switching device increases. When not fully "on" or "off," power switching devices typically have a significant voltage drop between leads, while also conducting current, thus resulting in significant internal power dissipation by the power switching devices.

The motor/generators 308, which could be the motors/generators 208 of FIG. 2, are attached mechanically to the propellers 309 in such a manner that the propellers 309 convey a torque to the shaft of the motor 308. The stator of the motor 308 is mounted to the airframe of the airborne wind turbine (which could be airborne wind turbine 201), along with all other components encircled by bounding box 301. The motor controllers 307 are connected electrically to the windings of motor/generators 308 and commutate power from a high voltage DC bus 318 as appropriate to drive the current phases of the motor/generators 308.

In an example embodiment, the motor/generators 308 have three-phase windings, while in other embodiments the motor/generators have some other number of phase windings, such as one-, two-, or six-phase windings. The motor controllers 307 source the required power to the appropriate phases of the motor/generators at appropriate times so as to either efficiently convert mechanical shaft power into electrical power or convert electrical power into mechanical shaft power. The motors controllers 307 are connected in both parallel and series to the DC line of the tether. Since the individual drive units in each drive-unit pair are connected to each other in parallel, the voltage at the intermediate voltage DC bus 319 will be approximately half of the incoming voltage on tether 303, provided that the total power draw of the first drive-unit pair (drive units 321 and 322) is substantially equal to the total power draw of the second drive-unit pair (drive units 323 and 324).

Note that, for explanatory purposes, two drive-unit pairs are depicted in FIG. 3. In other embodiments, such as that which will be described in reference to FIG. 4, four pairs of drive units are connected in series, such that a total of eight drive units are each exposed to an average of one quarter of the voltage between leads on the tether 303. Further, the number of drive-unit pairs may vary from these examples, without departing from the scope of the invention.

Each motor controller is connected to a high-side bus or a low-side bus, dependent in each case upon which drive unit the motor controller is a component of. The motor controller 307 of drive 321 is connected to the high voltage DC bus 318, which in turn is connected to the tether. The motor controller 307 of drive 321 is also connected to the intermediate voltage bus 319. The high voltage DC bus 318 may have any voltage acceptable for transfer of power over the tether 303, though for the purpose of illustration a nominal voltage of 2000V is assumed. Of course, other nominal voltages are possible, depending upon the particular implementation. The voltage of the intermediate voltage DC bus 319 is dependent on the power draw of the drive units 321, 322, 323, and 324, and the voltage of the ground bus 320 is dependant on the voltage drop along the conductors of the tether, relative to a reference zero voltage.

If the total power used by the drive units 321 and 322 is equal to the total power used by the drive units 323 and 324, the voltage across the drive units 321 and 322 will be equal to the voltage across drive units 323 and 324. Further, note that the voltage across the drive units 321 and 322 is equal to the voltage between high voltage DC bus 318 and intermediate voltage DC bus 319, and that the voltage across drive units 323 and 324 is equal to the voltage between the intermediate voltage DC bus 319 and the low voltage DC bus 320. Therefore, when the total power used by the drive units 321 and 322 is equal to the total power used by the drive units 323 and 324, the voltage between high voltage DC bus 318 and intermediate voltage DC bus 319 will be equal to the voltage between high voltage DC bus 318 and intermediate voltage DC bus 319. Thus, in this scenario, the voltage on the tether is equal to the voltage between high voltage DC bus 318 and low voltage DC bus 320, which is twice the voltage across any single drive unit 321, 322, 323, or 324.

Consider an example where the voltage across the tether 303 is "high"; close to 2000V, for instance. In this example, the current which should be carried by the tether is "low"; 300 amps on each of the two conductors, for instance. Configured as such, the motor controllers 307 can each operate on a nominal voltage of 1000V, and can thus expose the windings of the motors 309 to lower peak voltage differences. As lower-voltage transistors are typically more efficient and lower cost, the lower nominal voltage of the motor controllers 307 may help to allow for lower-mass and/or lower-cost equipment.

In a further aspect, FIG. 3 shows a motor control system 330. The control system 330 may implement control logic for the drive-units 321, 322, 323, and 324. In example embodiments, a motor control system, such as control system 330, may implement control logic by controlling the motor controllers 307. In particular, the control system may send control signals to motor controllers 307 via a control-signal bus 332. Such control signals may instruct or cause a motor controller 307 to adjust the amount and/or direction of current through the corresponding motor or motors in the same drive unit.

Further, control system 330 may be configured to receive, determine, and/or generate data that it can utilize to determine what control signals are appropriate. For example, control system 330 may receive or information from, or acquire information related to, the drive-units 321, 322, 323, and 324, such as: (a) the voltage measured across each drive unit, and/or (b) the current through each drive unit (and/or through each phase leg of the motors). The control system 330 may also receive other sensor data related to the kite 301. Control system 330 may also use other types of data when applying a control scheme.

Yet further, control system 330 may be operable to send separate control signals to each motor controller 307, such that the motor/generator 308 in each drive unit 321, 322, 323, 324 can be separately controlled. Thus, it should be understood that while FIG. 3 illustrates control-signal bus 332 with a single line, control system 330 may, in practice, be separately wired to (or communicate over separate wireless channels with) each motor controller 307, such that different control signals can be sent to each motor controller 307.

Note that it may be beneficial for the tether 303 to have a small cross section and a low mass. More specifically, a tether with a smaller cross section may allow for better system performance, since a the smaller cross section has less drag (and does not account for the majority of drag on the system) as the kite moves on its flightpath, such as when kite 101 flies along the flightpath 104. The lower weight may reduce the amount of thrust needed in order for the kite 101 to hover, and may also help to make the kite controllable. If the tether mass is high due to thick conductors, the dynamics of the tether will couple strongly with those of the kite, and reduce the ability of the kite to turn precisely. Additionally, as the tether diameter and thus drag increases, the parasitic losses increase. This may in turn may increase the size of the kite that is required to produce a given amount of power, and thus increase the loads. Thus, the use of a thin tether may be desirable.

The core of the tether comprises a light-weight high strength material such as a carbon fiber pultrusion. In various embodiments, the core may also comprise dry kevlar fibers, a kevlar fiber composite, UHMWPE, or any other high strength material of comparatively low mass to lower cost structural elements (i.e., steel). The conductors of the tether comprise a high conductivity material, for example copper or aluminum. In an example embodiment, the tether comprises a carbon fiber core and aluminum conductors. The conductors have a comparatively higher material density (roughly 2700 kg/m"3 for aluminum, 9000 kg/mA3 for copper), suggesting that conductor mass has a much larger impact on tether mass than on tether cross section.

For the purpose of reducing tether diameter, and primarily of reducing tether mass, the airborne wind turbine may transmit power to and from the tether at a high voltage so as to reduce conductor cross sectional area. The density of insulators of the tether may be lower than that of the conductor for a range of conductors and insulators. In some embodiments, the conductor comprises aluminum and the insulation comprises PVC. Furthermore, the desired volume of insulation per unit tether length at higher voltages (1300 volts and above) may increase far more slowly than the mass of conductor required at higher voltages decreases.

Figure 4:
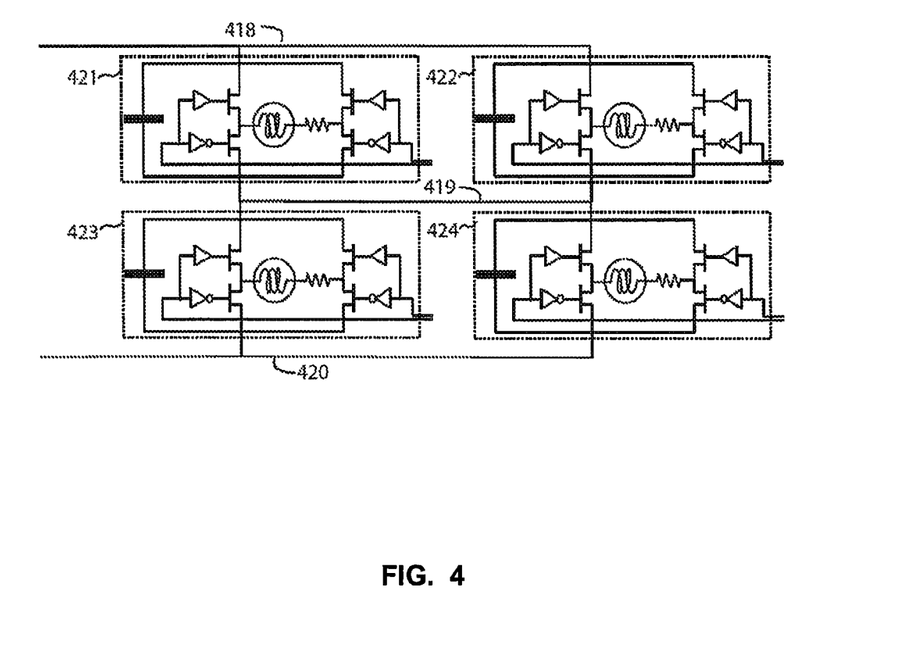
FIG. 4 is a diagram depicting a simplified equivalent circuit of an electrical system according to some embodiments of the present invention.

FIG. 4 is a diagram depicting a simplified equivalent circuit of an electrical system for an airborne wind turbine, such as for the example electrical system depicted in FIG. 3. The drive units 421, 422, 423, and 424 comprise motor controllers, motors (e.g., motor/generators), and propellers. In FIG. 4, the motors and propellers are represented by the inductances and resistances that are shown within the diagram of each drive unit 421, 422, 423, and 424. Drive units 421 and 422 are connected between high voltage DC bus 418 and intermediate voltage DC bus 419, while the drive units 423 and 424 are connected between intermediate voltage DC bus 419 and ground line 420. The combination of drive units 421 and 422 is switched such that the combination of these two units draws the same power as the combination drive units 423 and 424. There may be capacitors or low pass filters within or attached to each of the drive units, which are configured to regulate voltage and/or delay response times of the voltage that is apparent on intermediate bus 419, such that control encompassing all four drive units is capable of maintaining the voltage on the intermediate bus 419 at a roughly constant level.

Figure 5:
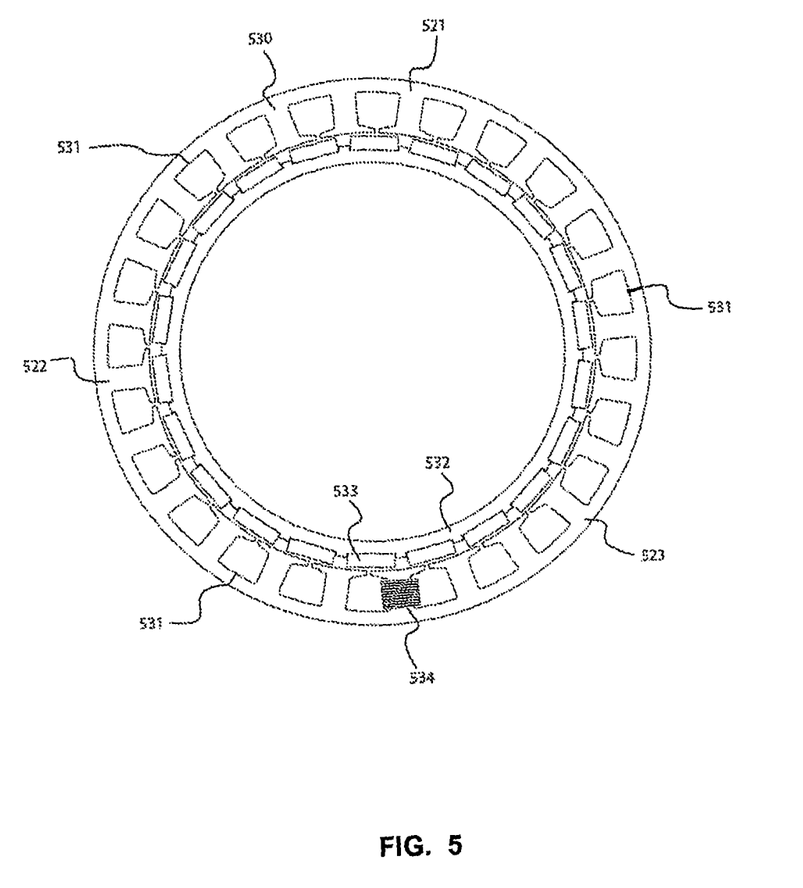
FIG. 5 is a diagram depicting a motor/generator according to some embodiments of the present invention.

FIG. 5 is a diagram depicting an embodiment of a motor/generator, such as the motor/generator 308 that is shown in FIG. 3. In particular, the electromechanical component a motor/generator is depicted from a front view, as projected along the axis of rotation. The motor/generator comprises stator iron 530 with teeth, such that coils of wire can be wound about the teeth. The motor/generator also comprises rotor iron 532, to which magnets 533 are bonded. As the rotor rotates relative to the stator, the alternating magnetic field produced by the magnets 533 produces a change in flux through the coils about the teeth of stator 530, generating back-EMF or the flow of electrical current. Due to the back-EMF induced along the wire of the coils 534, a voltage develops between different points along the length of wire.

In some embodiments, the motor/generator is controlled by a pulse-width modulating motor controller, such as the motor controller 307 depicted in FIG. 3. In such embodiments, the voltage difference across with wire in coils 534 is equal or nearly equal to the voltage on the bus that connects the motor controller and the motor/generator (e.g., the bus via which the motor controller sources power to, or sinks power from, the motor/generator).

The motor/generator of FIG. 5 further comprises isolating plates 531, which, in some embodiments, may function to segment the stator iron 530 into multiple segments. In such embodiments, the isolating plates 531 may function to electrically isolated each segment of the stator iron 530 from the other segments. Thus, in the illustrated embodiment, stator iron 530 is split into three electrically-isolated segments 521, 522, and 523. (The stator iron may be split into more or less segments, however, depending upon the particular implementation.) Further, in such an embodiment, the coils on each segment 521, 522, and 523 may be driven by a different motor controller. For example, the stator segment 521 might be connected to a first motor controller, the stator segment 522 to a second motor controller, and stator segment 523 to a third motor controller.

In a further aspect of such an embodiment, the bus connections of the separate motor controllers for segments 521, 522, and 523 may be connected in series, such that the voltages across the bus connections of the motor controllers are additive. For example, if the voltage across the bus line of each motor controller is 500V, the total voltage across the set of three motor controllers will be 1500V. When the switches within the motor controllers are respectively open and exposing the coils to a bus voltage, the isolation of each individual stator segment results, and the wire-to-wire voltage difference between any given wire in the coils 534 of any single stator segment 521, 522, and 523 is always less than or equal to 500V.

In some embodiments, isolating plates 531 fully encapsulate the stator segments and further act as a corrosion inhibitor or mechanism of environmental isolation, while in other embodiments, the isolating plates 531 only physically separate the stator segments and the air gap between the rotor magnets 533 and the stator 530 is relied on to provide voltage isolation. In some embodiments, the isolating plates 531 provide isolation between stator segments, and a sprayed on coating, for example a urethane paint, is applied to the surface of the stator segments to provide further voltage isolation between stator segments. In some embodiments of this invention, other types of motor/generators are used, for example the invention can comprise synchronous, induction, transverse flux, radial flux, axial flux, brushed or brushless type motors. In some embodiments, each motors/generator comprises isolated sections, for example the sections 521, 522, and 523, in an axially stacked configuration. In these embodiments each section is roughly equivalent of an independent motor/generator, but is mounted on the same shaft as the other sections.

Figure 6:
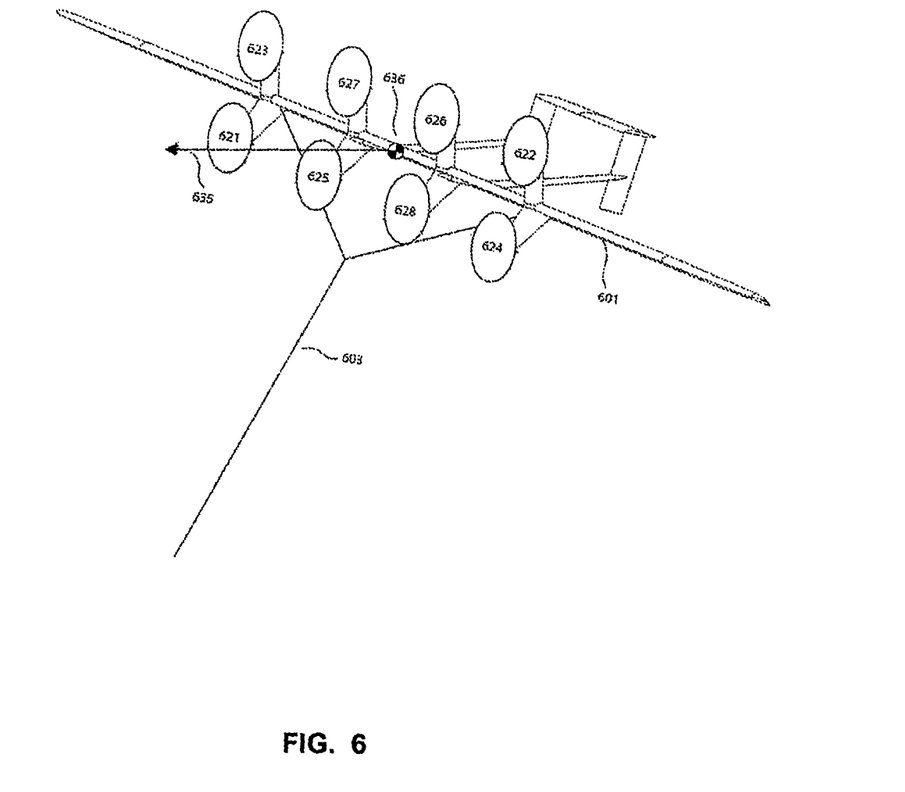
FIG. 6 is an illustration of an airborne power generation system according to some embodiments of the present invention.

FIG. 6 is a diagram depicting an embodiment of a kite 601 that may be used in airborne wind turbine, which is similar in design to the kite 201 depicted in FIG. 2. In the illustrated example, the airborne wind turbine 601 flies primarily in the "x" direction 635, which is substantially perpendicular to the plane of rotation of the rotors.

In an example embodiment, as gusts or changes in wind can interact with the kite 601 in a way which yaws or pitches the kite such that the x direction on the wing points into the apparent wind. At low flight speeds, the forces created by the lifting surfaces of the kite 601 are low, and it is desirable to add force to increase the rate at which the kite reorients into the apparent wind. In some embodiments, the kite 601 is not stable, and the forces and moments from the aerodynamic surfaces do not reorient the kite 601 such that the x direction on the wing points into the apparent wind. In such embodiments, some added force or moment may be required in order to maintain stability of the device. In either described embodiment or in any other embodiment, separate control signals to each rotor may be given (e.g., by the control system 330 shown in FIG. 3), resulting primarily in different thrust or drag on each rotor and thus in pitching moment, a yawing moment, or in an increase or reducing in drag force. In the present invention, in an example embodiment, drive units are located such that, if any pair of drive units connected in parallel are disabled, control authority and force balance on each of pitch, yaw, and thrust axis is maintained.

Drive units 623, 627, 626, and 622 are located above the pitch axis or center of mass of the kite 601. Drive units 621, 625, 628, and 624 are located below the pitch axis or center of mass of the kite 601. Drive units 621 and 622 are connected electrically in parallel. Each pair of drive units 623 and 624, 625 and 626, and 627 and 628 is also connected in parallel, with each drive-unit pair being connected to the next drive-unit pair in series.

As drive units 621 and 622 are located in mirrored locations about the center of mass 636, if both drive units are disabled there is no significant net torque about the center of mass. In some embodiments, this is useful in allowing for component failures, for example the failure of a motor controller or a motor/generator, without impact on the stability of the vehicle.

Each drive unit pair is respectively arranged such that the location of one drive unit in the pair is a mirrored location of the location of the other drive unit in the pair, about the center of mass of the aerial vehicle. In an example embodiment, the drive units above the wing are each positioned at substantially the same distance above the wing, and all drive units below the wing are positioned at substantially the same distance below the wing, and the horizontal spacing of each drive is consistent. Other arrangements of drive units are possible. For example, the drive units could be located in an octagonal pattern about the rim of a circular wing, or on pylons of different lengths or spacing. Other examples are also possible.

In the illustrated example, an increase in power input to drive units 623, 627, 626, and 622 by some differential amount dP, and an equivalent decrease in power input to drive units 621, 625, 628, and 624 by dP does not change the relative power usage by each pair of motors but results in a pitch-down torque on the kite 601. In the case that any drive pair is disabled, the same balance of power holds. For example, if drive units 621 and 622 are disabled and the rotors of said drive are free spinning, the remaining drive-unit pairs 623 and 624, 625 and 626, and 627 and 628 can apply a pitch down torque that is percentage of the amount that can be applied when all drive units are operable. Further, since each pair of drive units is connected in parallel, each drive-unit pair consumes substantially the same amount of power.

Thus, if all drive-unit pairs are connected in series to a bus of approximately fixed voltage, a disabled drive-unit pair will increase the voltage across each remaining parallel-connected pair. Alternately, in some embodiments, the high voltage DC bus voltage may be controlled on the kite 601 or on the ground at the other end of the tether 603, and the voltage on said bus may be accordingly be reduced in response to drive-unit pair being disabled, such that the substantially the same voltage is seen across each drive-unit pair in the series.

In hovering flight, kite 601 is suspended under thrust from all or some drive units. In an example embodiment, when no torque is output by the set of drive units, equal power is consumed by all drive units. The same mechanism of control as described in the crosswind case is used to apply pitching moment and yawing moment to the kite 601.

Figure 7:
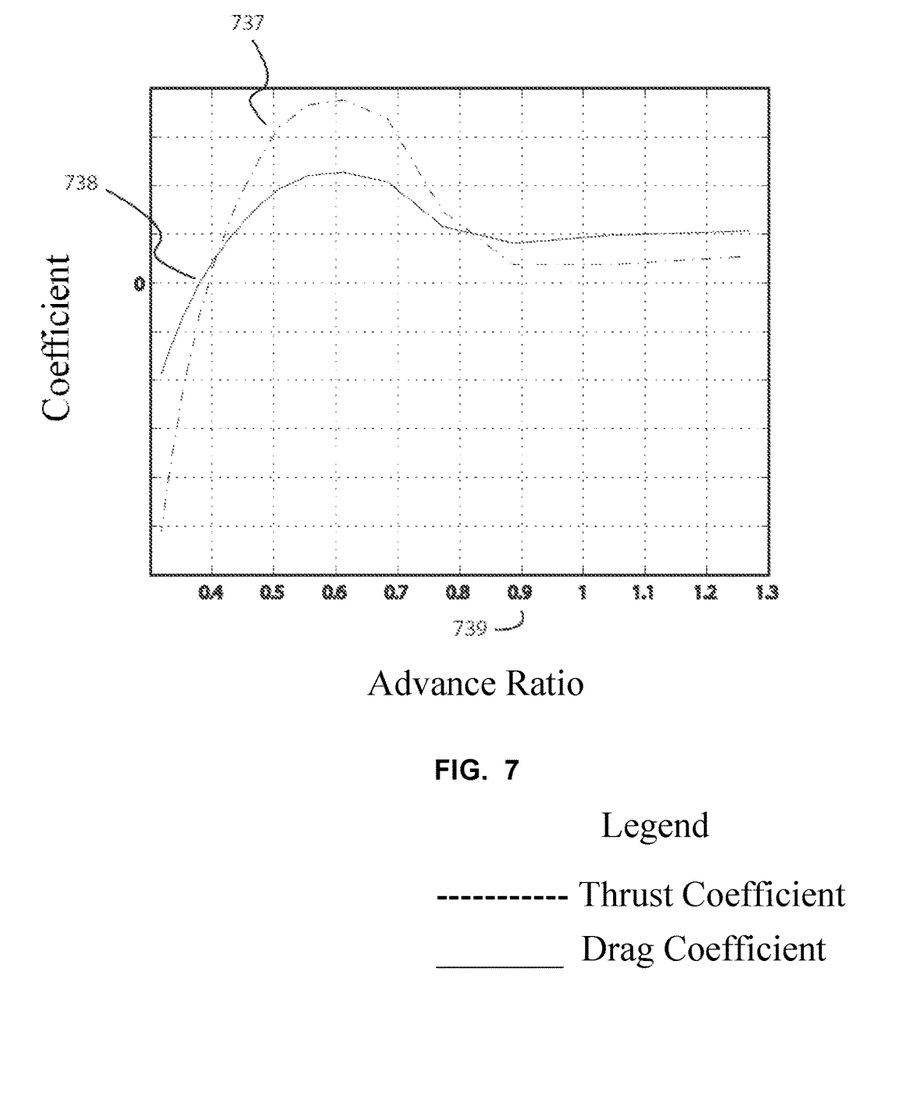
FIG. 7 is a diagram depicting the thrust and drag curves.

FIG. 7 is a diagram depicting the thrust (737) and drag (738) curves of a typical kite rotor. At a given apparent wind velocity on the rotor, there is an advance ratio (739) which yields no net thrust or drag. At higher advance ratios, the rotor generates torque about the axis of rotation, generating shaft power. At lower advance ratios, the rotor generates torque counter to the axis of rotation, requiring shaft power to maintain advance ratio. At high enough advance ratios, the angle of attack on the blades of the rotor increases near stall, and the power and drag produced by the rotors no longer increases at higher advance ratios. This effect determines the maximum allowable advance ratio, the advance ratio at which the rotor no longer produces greater power. In some embodiments, it is advantageous to operate all rotors near their maximum allowable advance ratio so as to maximize power generation at a given kite speed. The optimization of tether mass and tether drag naturally leads to high voltages.

Example embodiments may provide a method for interfacing between components that generate or consume power and the transmission line which transmits that power to another location. Specifically, example embodiments may apply to situations where there is a mismatch between a lower desired power conversion voltage and a higher desired power transmission voltage. The proposed method can support any non-prime number of power converters, and encompasses a means of stacking groups of power converters and the control scheme required for evenly balancing voltage across the stacks. For airborne wind turbines, the unit of power conversion is a propeller, motor, and motor controller set.

An example embodiment connects pairs of power converters across the center of mass of the wing in parallel and stacks these pairs in series. A control algorithm is then applied to ensure power flow is equalized across pairs, ensuring voltage stays within acceptable limits.

An alternative topology applies multiple motors and motor controller sets to each propeller shaft (e.g., such that each drive unit includes multiple motors and multiple motor controllers). A control algorithm is applied to ensure even power outtake across motors on the same shaft. The motor controller outputs can then be stacked in series and motor controllers from different shafts can be connected in parallel.

The effect of both of the strategies is to stack the output of several lower voltage motor outputs to interface with a higher voltage transmission element, while at the same time balancing power flow to maintain acceptable voltages at each stage in the stack.

CONCLUSION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A system comprising:
    an aerial vehicle comprising a plurality of propellers;
    a plurality of drive units coupled to the plurality of propellers, wherein each drive unit comprises a single motor/generator and a single motor controller, and is coupled to a single propeller of the plurality of propellers, wherein the plurality of drive units comprises at least two pairs of drive units comprising a first drive-unit pair and a second drive-unit pair; and
    a tether, wherein a high-voltage bus connects the motor controllers in the first drive-unit pair to the tether, wherein a low-voltage bus connects the motor controllers in the second drive-unit pair to the tether, and wherein an intermediate-voltage bus connects the motor controllers in series;

wherein the motor controllers in the first drive-unit pair are connected in parallel via the high-voltage bus and the intermediate-voltage bus, wherein the motor controllers in the second drive-unit pair are connected in parallel via the intermediate-voltage bus and the low-voltage bus;

wherein the tether is configured to transmit power down from the plurality of motor/generators when the drive units operate in a first mode, and to transmit power up to the plurality of motor/generators when the drive units operate in a second mode.

2. The system of claim 1, further comprising a motor control system operable to send control signals to each motor controller, such that each drive unit is separately controllable.

3. The system of claim 2, wherein the motor control system is configured to generate control signals that balances the voltage across the at least two pairs of drive units.

4. The system of claim 2, wherein the motor control system is configured to generate control signals that balances the voltage across the at least two pairs of drive units, wherein the motor control system is configured to generate control signals for two or more of the motor controllers such that a desired torque is applied to the aerial vehicle.

5. The system of claim 1, wherein each pair of drive units comprises a first drive unit arranged at a first location and a second drive unit arranged at a second location, and wherein, for each pair of drive units, the location of the first drive unit mirrors the location of the second drive unit about a center of mass of the aerial vehicle.

6. The system of claim 5:

wherein a first half of the plurality of drive units are each positioned at a first distance above a wing of the aerial vehicle, and are horizontally equidistant from one another; and wherein a second half of the plurality of drive units are each positioned at the first distance below the wing, and wherein the second half of the plurality of drive units are positioned opposite of the first half of the plurality of drive units with respect to a pitch axis of the aerial vehicle, such that the second half of the plurality of drive units are also horizontally equidistant from one another.

7. The system of claim 6, further comprising a motor control system, wherein the control system is configured to cause the propellers to apply torque to the aerial vehicle by adjusting the power input to drive units in at least one of the pairs of drive units, wherein any adjustment to the power input to one drive unit in a given pair of drive units is offset by an equal and opposite adjustment to the power input to the other drive unit in the given pair of drive units.

8. The system of claim 1, further comprising at least one override switch that is operable to bypass at least one pair of drive units.

9. The system of claim 1, further comprising a motor control system, wherein the control system is configured to:
detect a failure of at least one motor or motor controller in a particular pair of drive units; and
in response to the failure, generate control signals for one or more of the motor controllers that bypass the particular pair of drive units.

10. The system of claim 1, wherein the arrangement of the at least two drive units is such that all of the motor controllers operate at lower bus voltages than maximally allowed until there is a failure.

11. The system of claim 1 further comprising on-ground equipment adapted to adjust tether voltage when a motor controller fails so as to maintain equal bus voltage over each pair of motor controllers.

12. The system of claim 1, wherein each motor controller is a low-voltage motor controller, wherein the tether comprises a high-voltage transmission line, and wherein the arrangement of the at least two drive units allows for interfacing of the low-voltage motor controllers with the high-voltage transmission line.

13. The system of claim 1, further comprising a motor control system, wherein the motor control system is configured to apply a control scheme that generates control signals that balance voltage on the series-connected drive-unit pairs.

14. A system comprising:
a plurality of drive units that are couplable to a plurality of propellers, wherein each drive unit comprises a motor and a motor controller, wherein the plurality of drive units comprises at least two pairs of drive units comprising a first drive-unit pair and a second drive-unit pair;
a tether, wherein a high-voltage bus connects the motor controllers in the first drive-unit pair to the tether, wherein a low-voltage bus connects the motor controllers in the second drive-unit pair to the tether, and wherein an intermediate-voltage bus connects the motor controllers in series;
wherein the motor controllers in the first drive-unit pair are connected in parallel via the high-voltage bus and the intermediate-voltage bus,
wherein the motor controllers in the second drive-unit pair are connected in parallel via the intermediate-voltage bus and the low-voltage bus; and
a motor control system operable to send control signals to each motor controller, such that each drive unit is separately controllable, wherein the motor control system is configured to apply a control scheme that generates control signals that balance voltage on the series connected drive-unit pairs.

15. The system of claim 14, wherein each motor comprises a motor/generator, and wherein the tether configured to transmit power down from the plurality of motor/generators when the drive units operate in a first mode, and to transmit power up to the plurality of motor/generators when the drive units operate in a second mode.

16. A system comprising:
an aerial vehicle comprising a plurality of propellers;
a plurality of drive units coupled to the plurality of propellers, wherein each drive unit comprises a plurality of motor/generators and a corresponding plurality of motor controllers and is coupled to a single propeller of the plurality of propellers, wherein the plurality of drive units comprises at least two pairs of drive units comprising a first drive-unit pair and a second drive-unit pair;
a tether, wherein a high-voltage bus connects the motor controllers in the first drive-unit pair to the tether, wherein a low-voltage bus connects the motor controllers in the second drive-unit pair to the tether, and wherein an intermediate-voltage bus connects the motor controllers in series;
wherein the motor controllers in the first drive-unit pair are connected in parallel via the high-voltage bus and the intermediate-voltage bus,
wherein the motor controllers in the second drive-unit pair are connected in parallel via the intermediate-voltage bus and the low-voltage bus;

wherein the tether is configured to transmit power down from the plurality of motor/generators when the drive units operate in a first mode, and to transmit power up to the plurality of motor/generators when the drive units operate in a second mode; and
a motor control system operable to send control signals to each motor controller, such that each drive unit is separately controllable, wherein the motor control system is configured to apply a control scheme that generates control signals that, for each drive unit, evens power outtake across each motor/generator of the plurality of motor/generators.

* * * * *